United States Patent [19]

Riley

[11] Patent Number: 4,924,164
[45] Date of Patent: May 8, 1990

[54] SOFTWARE ZONING OF CONVEYOR CONTROL

[75] Inventor: Ron J. Riley, Grand Blanc, Mich.

[73] Assignee: J. N. Fauver Company, Inc., Madison Heights, Mich.

[21] Appl. No.: 179,551

[22] Filed: Apr. 8, 1988

[51] Int. Cl.$^5$ .............................................. G05B 19/18
[52] U.S. Cl. ...................................... 318/587; 318/38; 318/640; 318/602; 212/122; 180/168
[58] Field of Search ................... 318/16, 38, 135, 396, 318/480, 587, 603, 625, 632, 602; 180/167, 168, 169, 9.1, 9.26, 6.48, 9.48, 140; 414/10, 750, 376, 538, 508, 589, 222, 495; 212/76, 77, 80, 86, 90, 124, 126, 131, 132, 133, 141, 122, 149, 150, 152, 153, 154, 159, 170, 173, 175, 182, 189, 200, 203, 205, 212, 213, 215, 223, 226, 244, 265; 198/304, 311, 318, 316.1, 352, 356, 505, 751, 830, 861.1, 861.2

[56] References Cited

U.S. PATENT DOCUMENTS

| | | | |
|---|---|---|---|
| 2,980,264 | 4/1961 | Burt et al. | 212/132 X |
| 3,247,933 | 4/1966 | Hanna | 212/122 X |
| 4,005,349 | 1/1977 | Brian | 318/602 X |
| 4,066,877 | 1/1978 | Virnot et al. | 180/168 X |
| 4,109,799 | 8/1978 | Munn | 212/122 X |
| 4,236,255 | 11/1980 | Burgener et al. | 180/168 X |
| 4,278,142 | 7/1981 | Kono | 180/168 |
| 4,515,281 | 5/1985 | Maki | 212/122 X |
| 4,636,962 | 1/1987 | Broyden et al. | 212/149 X |
| 4,639,874 | 1/1987 | Pezaris | 318/640 X |
| 4,658,928 | 4/1987 | Seo | 318/587 X |
| 4,669,619 | 6/1987 | Kimblad | 212/160 |
| 4,687,109 | 8/1987 | Davis | 212/126 X |
| 4,716,346 | 12/1987 | Matsuo | 318/38 |
| 4,716,530 | 12/1987 | Ogawa et al. | 318/587 X |
| 4,754,886 | 7/1988 | Hirano | 212/122 X |
| 4,756,431 | 7/1988 | Hirano | 212/122 X |

Primary Examiner—William M. Shoop, Jr.
Assistant Examiner—Paul Ip
Attorney, Agent, or Firm—Reising, Ethington, Barnard, Perry & Milton

[57] ABSTRACT

The assembly (10) is a self-propelled conveyor system including a vehicle (12) having wheels (18) and a motor (16) for moving the vehicle (12) along a track (20). The vehicle (12) includes a speed sensor (24) for sensing actual speed of the vehicle (12) and a location sensor (26) for sensing the absolute position of the vehicle (12) along the track (20). A control (22) receives the actual speed and absolute location signals and drives the vehicle (12) at a speed associated with the absolute position, this value being obtained from a memory (32). The control (22) drives the motor (16) at the selected speed with a feedback signal of actual speed wherein the control (22) may adjust the drive signal when actual speed differs from selected speed.

10 Claims, 2 Drawing Sheets

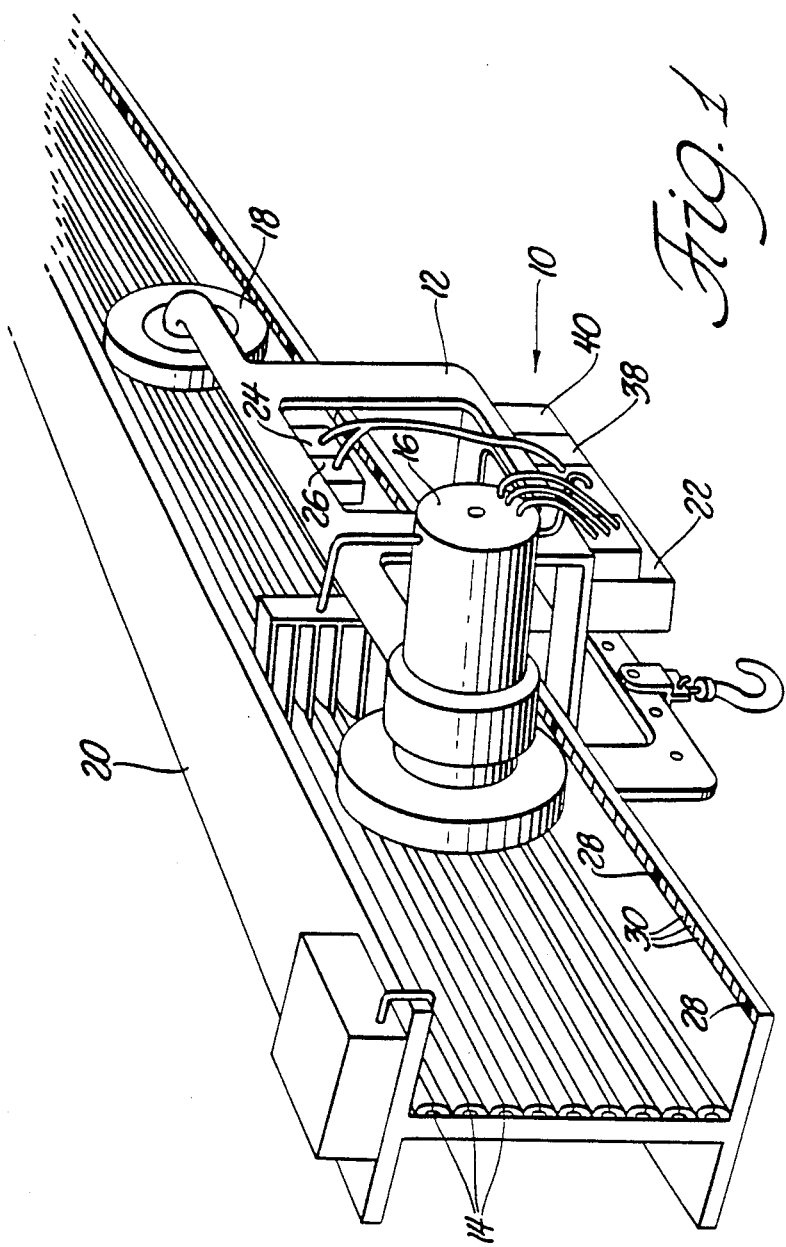

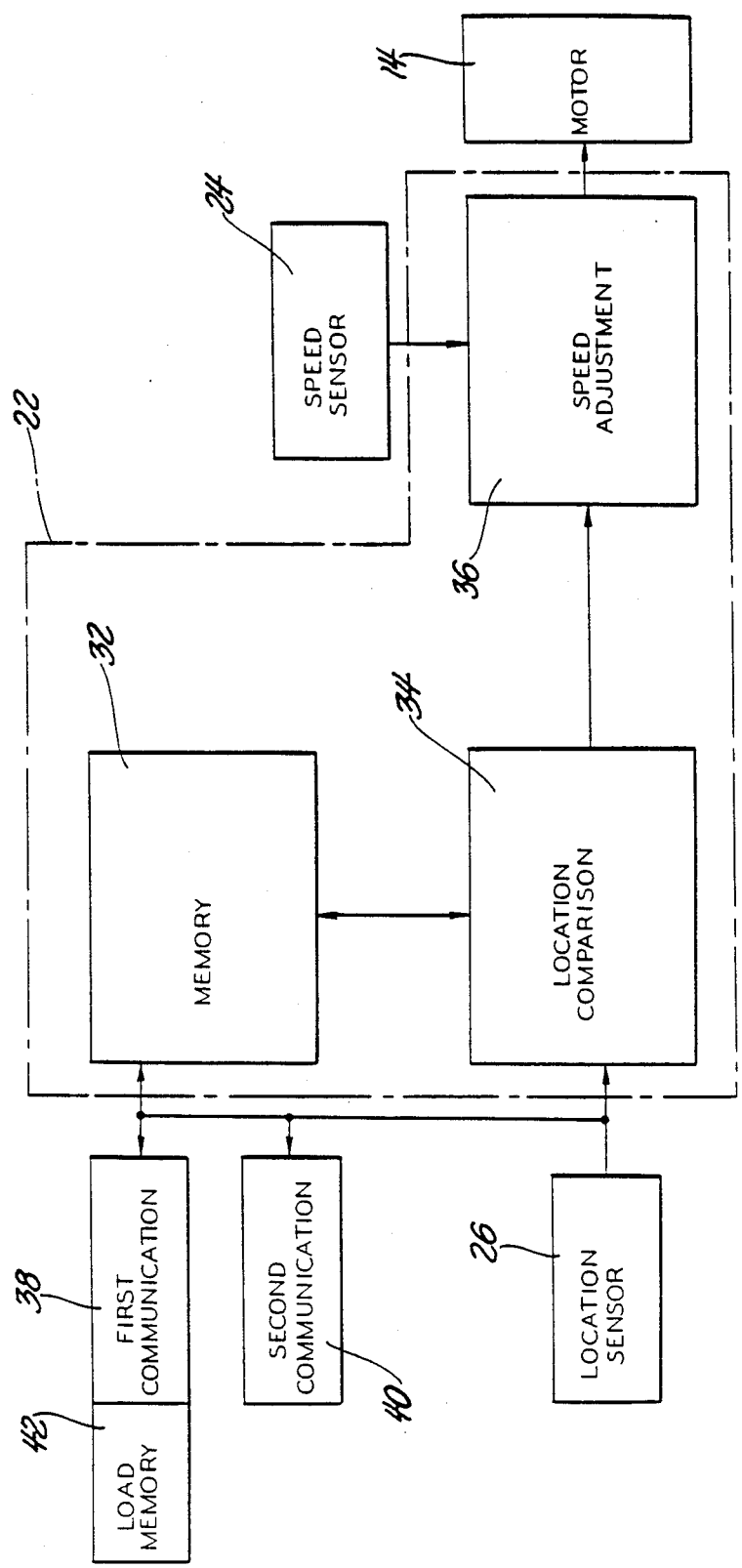

SOFTWARE ZONING OF CONVEYOR CONTROL

TECHNICAL FIELD

The invention relates to a conveyor control system having self propelled vehicles which move along a track, and more specifically, to vehicles requiring no external control.

BACKGROUND OF THE INVENTION

Conveyor control systems have in the past included chains running along the track to which each trolley or vehicle is connected. The speed of the vehicles is constant as is the space between the vehicles. A problem with this type of assembly is that if the chain breaks or one of the vehicles breaks down, the entire system must come to a halt. Therefore, conveyor control systems are using vehicles to have a motor thereon to turn the wheels which receive power from the power rails running along the track. Each vehicle is self propelled so that if one of the vehicles breaks down, the vehicle can be removed without a total disablement of the conveyor system.

One type of an assembly includes self propelled vehicles having a drive motor supplied power via current rails. Included is a rail supplying a command signal which is detected by a vehicle indicative of the speed that the vehicle is to move at. The rail is in isolated sections to present different areas of track with different speeds. The vehicle receives and interprets the command signal and drives the vehicle motor at this requested speed unless external sensors thereon determine the presence of another vehicle or object within its path. Such a system is disclosed in copending application U.S. Ser. No. 028,793 filed Mar. 23, 1987 invented by the inventor herein named and assigned to the assignee of the subject invention. The problem with this type of assembly is that the external command signal needs to be continuously provided, and absolute position along the track where the vehicle moves is unknown.

SUMMARY OF THE INVENTION AND ADVANTAGES

The invention is a conveyor vehicle assembly which includes wheels for mobility to move along a track a motor for rotating the wheels wherein power rails are provided for supplying power to the motor. The assembly comprises a vehicle including wheels for mobility and a motor means on the vehicle powered by rail voltages for rotating the wheels to move the vehicle. The assembly also includes speed sensor means on the vehicle for sensing the speed the vehicle is moving at and location sensor means on the vehicle for sensing the absolute location of the vehicle on the track. The control means on the vehicle is responsive to the speed sensor means for driving the motor means at a predetermined speed determined by the absolute location of the vehicle on the track determined by the location sensor means.

The method includes the steps of sensing the absolute location of the vehicle along the track, establishing the speed of the vehicle based on the absolute location of the vehicle along the track to produce a speed signal to drive the motor.

The present invention improves the prior art by simplifying the track configuration and allowing the vehicle to be totally independent of external stimulation for speed and routing control.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the preferred embodiment of the subject invention; and FIG. 2 is a block diagram of the control means of the subject invention.

DESCRIPTION OF THE PREFERRED EMBODIMENT

A conveyor control assembly which is powered from a power source 14 is generally shown at 10 in FIG. 1. The conveyor control assembly 10 includes a trolley vehicle 12 which has wheels 18 for mobility. The vehicle 12 has a variable speed motor 16 for rotating the wheels 18 to drive the vehicle 12 at variable speeds. The vehicle 12 generally moves along a track 20.

The assembly 10 includes control means 22 on the vehicle 12 for interconnecting the motor means 16 and the power source 14 to control the amount of power allocated to motor means 16 to vary the speed the vehicle 12 is to move at. The motor means 16 may include a variety of different types of motors, such as a three phase motor used with an inverter, or a split capacitor motor.

The assembly 10 includes speed sensor means 24 on the vehicle 12 for sensing the actual speed the vehicle 12 is moving at producing an actual speed signal. Also included is location sensor means 26 on the vehicle 12 for sensing the absolute location of the vehicle 12 on the track 20 producing an absolute location signal. The speed sensor means 24 and the location sensor means 26 may be any type of transducer, such as magnetic transducers.

The track 20 includes spaced location markers 28 and equally spaced speed markers 30 for disposition along the track which are sensed by speed sensor means 24 and the location sensor means 26. The track 20 may include a location marker 28 spaced every ten feet along the track 20. Within each location marker 28, there is included a plurality of equally spaced speed markers 30. The location markers 28 are configured such that the absolute location on the track 20 may be read from the location marker 28; the location markers 28 are not of the incremental type. The control means 22 includes a timer 29 to determine the speed by timing the actual distance between each of the speed markers 30 and determines the absolute location by reading the location markers 28. The control means 22 includes incremental location counter 31 which senses incremental position between location markers 28 by the speed sensor means 24. Every occurrence of the location markers 28 sensed by the location sensor means 26 will update and correct the incremental count from the speed markers 30. The speed sensor means 24 and speed markers 30 combination are preferably a transducer of the variable reluctance type, or alternatively the photo-electric type. The location sensor means 26 and location markers 28 combination may be a transducer of the bar code or metallic coded type. The transducers 24, 26 and markers 28, 30 are not limited to any specific type. Alternatively, the transducers may distance and speed by rotational movement.

More specifically, the control means 22 on the vehicle 12 is responsive to the speed sensor means 24 for driving the motor means 16 at a predetermined speed determined by the absolute location of the vehicle 12 on the track 20. In other words, the control means 22 will move the vehicle 12 at a speed dependant on the absolute location of the vehicle 12 on the track 20 and will utilize the speed sensor means 24 output to insure the vehicle 12 is moving at the requested speed determined by the vehicle's absolute location.

The control means 22 includes memory means 32 which contains speed values representative of selected speeds with corresponding absolute locations of the track 20. The memory means 32 contains the absolute locations on the track 20 along with a respective selected speed. Therefore, when an absolute location is selected, an associated selected speed is also acquired. The memory means 32 may be a RAM (random access memory) whose memory is able to be revised or updated, i.e., the associated selected speed values.

The control means 22 includes location comparison means 34 responsive to the location sensor means 26 and incremental location counter 31 for establishing the speed of the vehicle 12 by selecting the speed stored in the memory means 32 for the absolute and incremental location of the vehicle 12 along the track 20 to produce a speed signal to drive the motor means 16. In other words, a speed signal is produced which is representative of the selected speed. The selected speed is obtained from the memory means 32 and corresponds to the absolute and incremental location sensed by the location sensor means 26. Therefore, the location sensor means 26 senses the absolute position of the vehicle 12 along the track 20 and acquires the selected speed that corresponds to that location from the memory means 32, and the comparison means 34 produces a speed signal which is representative of that selected speed.

For example, the memory means 32 may include a searchable location field. As further illustration, assume the vehicle 12 is at absolute location "6" representative of 60 feet from a reference. When the location field "6" is obtained from the memory 32, a selected speed number, i.e. "4", will also be obtained. The "4" may represent 4 miles per hour to the location comparison means 34.

The control means 22 also includes speed adjustment means 36 responsive to the comparison means 34 and the speed sensor means 24 for adjusting the speed signal to drive the motor means 16 at the selected speed. As previously stated, the speed sensor means 24 senses the actual speed that the vehicle 12 is moving at and is used as feedback of the assembly 10 to the speed adjustment means 36. The speed signal represents the numerical selected speed which the vehicle is to be moving at. These two speeds are received by the speed adjustment means 36 which will produce a drive signal to the motor means 16 to drive the vehicle 12 at the selected speed. In other words, the selected speed actual sensed speed may not be the same based on offsets and loads in the assembly. Therefore, a correction of the actual speed may be necessary to match the selected speed, which is accomplished by the adjustment means 36 varying the speed signal to produce the drive signal. If the speed signal and actual speed represent the same speed, no adjustment to the speed signal is necessary and the drive signal will equal the speed signal. The location comparison means 34 and the speed adjustment means 36 may be implemented through software of a processor and motor drive.

The vehicle 12 includes first communication means 38 for transmitting and receiving information. This first communication means 38 is preferably an infrared communication link. The first communication means 38 includes load memory 42 and the first communication means 38 transmits and receives information regarding what has been done to the load on the vehicle 12 at different stations along the track 20, and information associated directly with the type of load. Additionally, the first communication means 38 is connected to the memory means 32 and any changes in the memory means 32 may be communicated through the first communication means 38. The first communication means 38 preferably operates when at rest in a station on the track 20 due to the directivity of the infrared link, but the system may be adapted to provide communication along straight portions of the track 20. The baud rate may be approximately 9600. The station may be part of the global system control for the entire conveyor system. The global system is that part of the system by which the operator can make changes in individual 12. If parameters are to be changed in a vehicle, the global system will communicate with the vehicle 12 in order to make any modifications.

The vehicle 12 includes second communication means 40 for transmitting and receiving global system information. The second communication means 40 is connected to the location sensor means 26. The second communication means 40 is preferably a radio frequency line carrier. Due to noise in the system, the baud rate should be kept approximately at or below 1200, but this may vary depending on ambient electrical noise. The second communication means 40 is used to respond to a global system's initiation to communicate with the vehicle 12 for identification of its location to the overall system control. Due to the noise constraints, only short messages should be transmitted.

The first and second communication means 38, 40 may transmit and receive any type of information to and from the global system, and the specific connections illustrated in FIG. 2 are for example and not limiting.

The control means 22 may by implemented by a microcomputer and motor drive.

The assembly 10 may be specifically used in a conveyor system as indicated in FIG. 1 and as described in the above mentioned U.S. Ser. No. 028,793. The power source 14 may be sourced by power rails 14 which are placed along the track 20. There may be four power rails 14 representing three phase power and ground. The assembly 10 receives the power off the rails by contacting fingers electrically interconnecting the rail and control circuitry and meter. The track 20 may be comprised of an I-beam configuration track. The location markers 28 and speed markers 30 may be attached to the track 20 with the speed sensor means 24 and location sensor means 26 attached to the vehicle 12 to move therewith. This type of configuration will allow for a completely self-automated system supplied power by the rails 14. No external signal or control need to be supplied to the vehicle 12 in order to control speed of the vehicle 12. The global system control may communicate to the vehicles 12 for location purposes or emergency conditions through the second communication means 40. Information may be stored on the vehicle 12 through the first communication means 38 regarding load or changes in speed control. The assembly 10 may include override capabilities as disclosed in U.S. Ser. No. 028,793.

Also included is a method of moving vehicles 12 along a track 20 which includes a motor 16 for driving wheels 18. The steps include sensing 24 the actual speed the vehicle 12 is moving at, sensing 26 the absolute location of the vehicle 12 on the track 20, establishing 34 the speed of the vehicle based on the absolute location of the vehicle 12 producing a speed signal to drive the motor 16, and adjusting 36 the speed signal based on the sensed speed to move the vehicle 12 at the selected speed. Also included is storing 32 information of selected speed and absolute location, receiving 38 information for revising the selected speed, receiving the transmitting information regarding the vehicle's 12 load, receiving 40 and transmitting information of global control such as absolute position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A conveyor vehicle assembly (10) including wheels for mobility to move along a track and a motor for rotating the wheels wherein power rails are provided for supplying power to the motor, said assembly comprising; a vehicle (12) including wheels (18) for moving said vehicle (12) about a track, motor means (16) on said vehicle for receiving power from power rails along the track and external said vehicle for rotating said wheels (18) to move said vehicle (12), speed sensor means (24) on said vehicle (12) for sensing the speed of said vehicle (12) and for producing an actual speed signal, location sensor means (26) on said vehicle (12) for sensing the absolute location of said vehicle (12) along the track (20) and for producing a position signal, control means (22) connected to and moving with said vehicle (12) for receiving said actual speed signal and said position signal and for driving said motor means (16) to move said vehicle (12) at a predetermined speed determined by the absolute location of said vehicle (12) along the track (20); said control means (22) including memory means (32) containing speed values representing a selected speed relative to absolute locations on the track (20), location comparison means (34) responsive to said location sensor means (28) for receiving and comparing the position signal to to obtain the predetermined speed stored in the memory means (32) said memory means (32) for the absolute location of said vehicle (12) along the track (20) to produce an ideal speed signal indicative of the predetermined speed, speed adjustment means (36) for receiving said actual speed signal and said ideal speed signal to adjust the speed of said motor means (16) to move said vehicle at said predetermined speed.

2. An assembly as set forth in claim 1 further characterized by said speed sensor means (24) and said location sensor means (26) being magnetic transducers, and including spaced location markers (28) and equally spaced speed markers (30) for disposition along the track and for said control means to determine actual speed by timing the distance between said speed markers (30) and to determine the absolute location by reading said location markers (28).

3. An assembly as set forth in claim 2 further characterized by said vehicle (12) including first communication means (38) for transmitting and receiving information regarding a load on said vehicle (12) and communicating revisions to said memory means (32).

4. An assembly as set forth in claim 3 further characterized by said vehicle (12) including second communications means (40) for transmitting and receiving information from a global system control.

5. An assembly as set forth in claim 4 further characterized by said first communication means (38) being an infrared communication link.

6. An assembly as set forth in claim 5 further characterized by said second communication means (40) being a radio frequency line carrier.

7. A conveyor vehicle assembly (10) including wheels for mobility for moving a vehicle along a track and including a motor for rotating the wheels wherein power rails are provided for supplying power to the motor, said assembly comprising; a vehicle (12) including wheels (18) for moving said vehicle (12) about a track, motor means (16) on said vehicle powered by rail voltages (14) for rotating said wheels (18) to move said vehicle (12), speed sensor means (24) on said vehicle for sensing the speed of said vehicle (12) and for producing a speed signal, location sensor means (26) on said vehicle (12) for sensing the absolute location of said vehicle (12) along the track (20) and for producing a position signal, control means (22) connected to and moving with said vehicle (12) for receiving said speed signal and said position signal and for driving said motor means (16) to move said vehicle (12) with said control means (22) at a predetermined speed determined by the absolute location of said vehicle (12) along the track (20); said control means (22) including memory means (32) containing speed values representing a selected speed relative to absolute locations on the track (20), location comparison means (34) responsive to said location sensor means (28) for receiving and comparing the position signal to said memory means (32) to obtain the predetermined speed stored in the memory means (32) for the absolute location of said vehicle (12) along the track (20) to produce an ideal speed signal indicative of the predetermined speed, speed adjustment means (36) for receiving said actual speed signal and said ideal speed signal to adjust the speed of said motor means (16) to move said vehicle at said predetermined speed; and spaced location markers (28) and equally spaced speed markers (30) for disposition along the track and for said control means to determine actual speed by timing the distance between said speed markers (30) and to determine the absolute location along the track by reading said location markers (28).

8. A method of moving a vehicle (12) along a track (20) which includes a motor (16) for driving wheels (18) and power rails for supplying power to the motor, the method including the step of; sensing (26) the absolute location of the vehicle (12) along the track (20), sensing (24) the actual speed of the vehicle (12), sensing the absolute location of the vehicle (12) along the track (20), comparing the absolute location to memory to obtain a predetermined speed at which the vehicle is to move, producing a speed signal to drive the motor (16) based on the predetermined speed, and adjusting the speed signal based on the sensed actual speed to drive the motor at the predetermined speed.

9. A conveyor vehicle assembly (10) including wheels for mobility to move along a track and a motor for rotating the wheels wherein power rails are provided for supplying power to the motor, said assembly comprising; a vehicle (12) including wheels (18) for moving said vehicle (12) about a track, motor means (16) on said vehicle for receiving power from power rails along the track and external said vehicle for rotating said wheels (18) to move said vehicle (12), speed sensor means (24) on said vehicle (12) for sensing the speed of said vehicle (12) and for producing an actual speed signal, location sensor means (26) on said vehicle (12) for sensing the absolute location of said vehicle (12) along the track (20) and for producing a position signal, control means (22) connected to and moving with said vehicle (12) for receiving said actual speed signal and said position signal and for driving said motor means (16) to move said vehicle (12) at a predetermined speed determined by the absolute location of said vehicle (12) along the track (20); said control means (22) including memory means (32) containing speed values representing a selected speed relative to absolute locations on the track (20), location comparison means (34) responsive to said location sensor means (28) for receiving and comparing the position signal to said memory means (32) to obtain the predetermined speed stored in the memory means (32) of the absolute location of said vehicle (12) along the track (20) to produce an ideal speed signal indicative of the predetermined speed, speed adjustment means (36) for receiving said actual speed signal and said ideal speed signal to adjust the speed of said motor means (16) to move said vehicle at said predetermined speed, and communication means connected to said memory means for receiving and revising said memory means (32).

10. An assembly as set forth in claim 9 further characterized by said communication means being an infrared communication link.

* * * * *